United States Patent [19]

Weik

[11] 4,277,043
[45] Jul. 7, 1981

[54] LOCKING ASSEMBLY FOR AIRCRAFT SEAT

[75] Inventor: Kirby B. Weik, Litchfield, Conn.

[73] Assignee: Koehler-Dayton, Inc., New Britain, Conn.

[21] Appl. No.: 42,325

[22] Filed: May 25, 1979

[51] Int. Cl.³ .............................................. A47B 97/00
[52] U.S. Cl. ................................ 248/503.1; 410/105
[58] Field of Search ..................... 248/503, 503.1, 429, 248/501; 410/105, 79, 69, 94

[56] References Cited

U.S. PATENT DOCUMENTS

| | | | |
|---|---|---|---|
| 3,392,954 | 7/1968 | Malitte | 248/429 |
| 3,620,171 | 11/1971 | Brenia et al. | 410/105 |
| 3,652,050 | 3/1972 | Marrujo | 248/501 X |
| 4,047,689 | 9/1977 | Grendahl | 410/105 |
| 4,062,298 | 12/1977 | Weik | 410/105 |
| 4,085,684 | 4/1978 | McLennan | 410/105 |
| 4,116,412 | 9/1978 | Walden | 248/635 |

Primary Examiner—J. Franklin Foss

Attorney, Agent, or Firm—Spencer T. Smith

[57] ABSTRACT

A locking assembly for a seat leg of a vehicular seat which is to be releasably secured to a track member having a plurality of longitudinally spaced openings interconnected by slots in the top surface thereof and an internal channel communicating with these openings and slots, comprising a shear pin member selectively configured for substantial mating insertion into one of the spaced track openings, the shear pin member including a flange for engaging the top surface of the track when the shear pin is inserted into one of these openings, pad means selectively configured for insertion into at least one opening of the track member and for longitudinal displacement in the interior channel to a selected position beneath the track slots, control means for displacing the shear pin downwardly when the locking assembly is at the selected position until said shear pin flange engages the top surface of the track and for then displacing the pad means upwardly until the track member is forcefully clamped between the pad means and the flange.

2 Claims, 3 Drawing Figures

U.S. Patent    Jul. 7, 1981    4,277,043
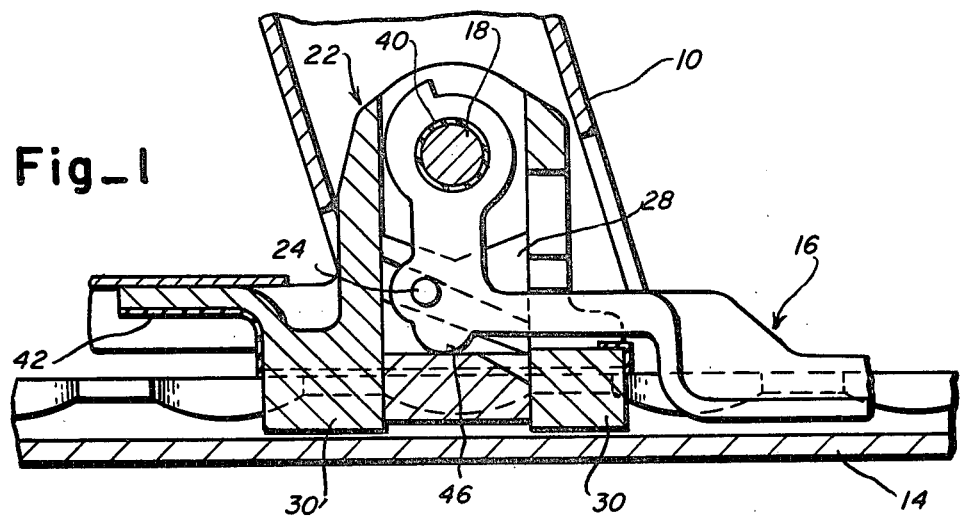
Fig_1
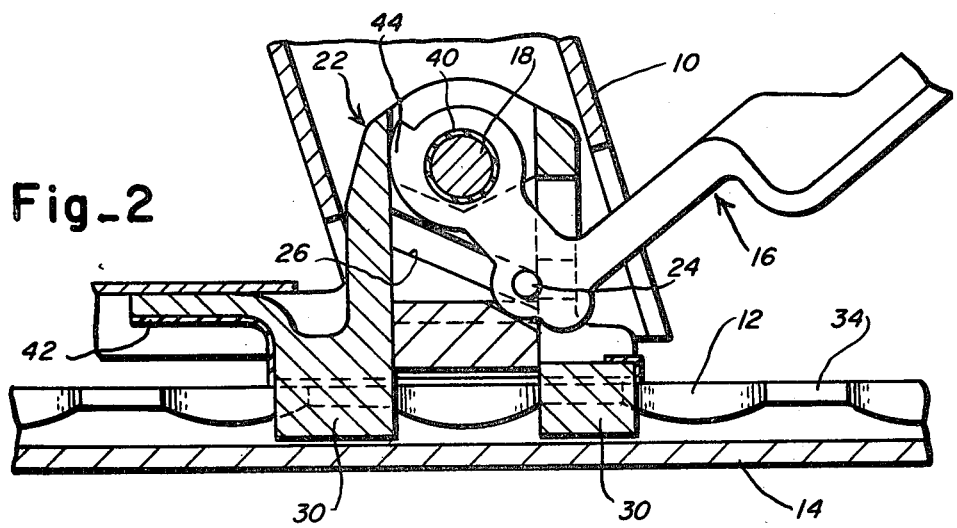
Fig_2
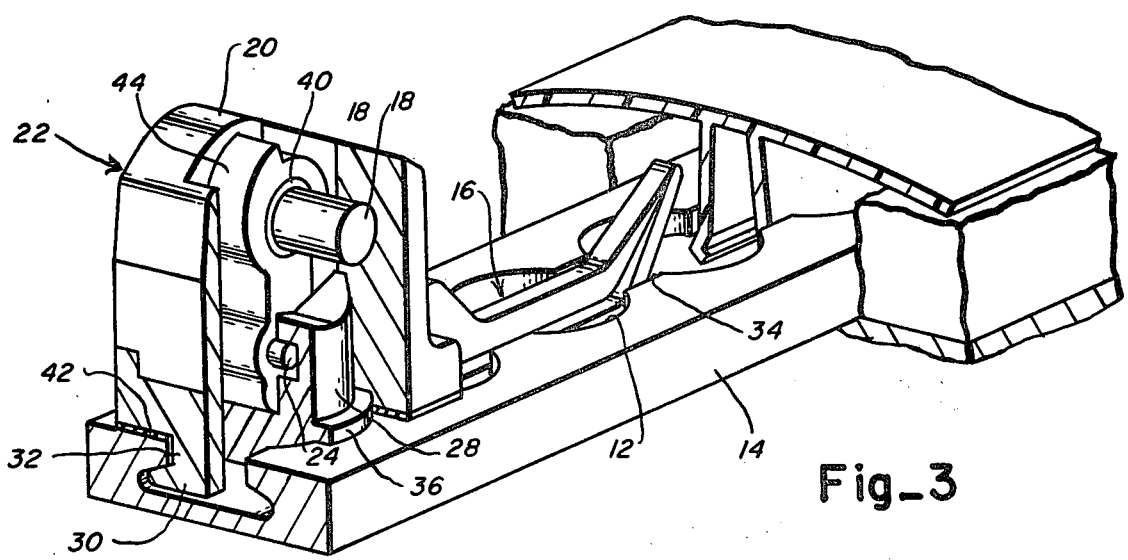
Fig_3

LOCKING ASSEMBLY FOR AIRCRAFT SEAT

The present invention relates to vehicular seats such as aircraft seats which are releasably secured to track members secured to the floor of the vehicle, and more particularly, to a technology for securing the removable seats to these track members.

Conventionally, seats are secured to the track member by tightening bolts or the like with the use of hand tools such as wrenches. This is a time consuming, and hence, undesirable technique.

It is, accordingly, an object of the present invention to provide means for securing an aircraft seat to the track members which does not require the utilization of hand tools and which can be effected in an absolute minimum of time.

Other objects and advantages of the present invention will become apparent from the following portion of the specification and from the accompanying drawings which illustrate, in accordance with the mandate of the patent statutes, presently preferred embodiments incorporating the principals of the invention.

Referring to the drawings:

FIG. 1 is a cross-sectional view of a track locking assembly for the rear legs of an aircraft seat shown in the locked condition;

FIG. 2 is a view similar to that of FIG. 4 with the track locking assembly in an unlocked condition; and FIG. 3 is an oblique view of the track locking assembly illustrated in FIGS. 2 and 3.

The preferred embodiment is a seat locking assembly for a rear leg 10 of an aircraft seat. Conventionally, a sheer pin secured to the rear leg of an aircraft seat is maintained within one of the cylindrical openings 12 in a track member 14 to prevent longitudinal displacement of the seat along the track member. The rear seat locking assembly includes a control lever 16 which is secured for pivotal movement on a shaft 18 mounted on opposing struts 20 of the rear seat locking assembly housing 22. The control lever is substantially L-shaped in configuration and includes an outwardly projecting pin 24 at the corner thereof which selectively enters an inclined slot 26 in the sheer pin member 28. The sheer pin member is vertically displaceable in the locking assembly housing 22 which is suitably secured to a rear seat leg. Rotation of the control lever from an unlocked position, as shown in FIG. 2, to a locked position, as shown in FIG. 1, accordingly, cams this sheer pin downwardly into one of the cylindrical openings 12 in the track member 14. The housing or fitting 22 also includes front and rear pads or lugs 30 at the bottom thereof which are selectively dimensioned so that they can be inserted down through the vertical openings 12 in the track member. The pads merge into reduced diameter sections 32 which permit longitudinal displacement of the fitting along the track member so that the pad members can be contained within the slot 34 defined in the track member at a location intermediate two openings. The shear pin portion includes an outwardly extending flanged section 36 which engages the top surface of the track member. This flange member forcefully engages the top surface of the track member as the control lever is lowered resulting in the upward lifting of the pad members into forced engagement with the interior upper surface of the track channel as the control lever is further depressed. The rear seat leg is thereby locked or clamped to the track member with the shear pin within one of the vertical openings.

A resilient elastomer bushing 40 is located between the control lever 16 and the shaft 18 to the requisite clamping force to lock the seat leg to the track without causing component wear. Additionally, a resilient elastomer buffer 42 is secured to the bottom of the locking assembly to facilitate displacement of the seat along the track.

As can be seen from FIGS. 1 and 2, the control lever will be maintained at either the fully elevated (releasing) or fully depressed (locking) position by the relationship existent at that time between camming surfaces 44, 46 on the control lever and the related camming surfaces.

The invention claimed is:

1. An aircraft seat adapted to be releasably secured to a track having a plurality of longitudinally spaced openings interconnected by slots in the top surface thereof and an internal channel communicating with these openings and slots, comprising:

a rear leg,
   a track fitting secured to said rear leg including lug means selectively sized and located for downward insertion into the track channel through selected track openings and for longitudinal displacement therein to a selected position beneath said track slots,
   a shear pin selectively configured for substantial mating insertion into one of the spaced track openings,
   said shear pin including a flange for engaging the top surface of said track when said shear pin is inserted into one of said openings,
   an L-shaped control lever pivotally mounted to said fitting on one end and having a medial elbow portion for camming said shear pin downwardly when said track fitting is at said selected position until said shear pin flange engages the top surface of said track and for then displacing said lug means upwardly until said track member is forcefully clamped between said lug means and said flange,
   said elbow portion including lobe means for maintaining said control lever in its forceful clamping position, and
   pin means projecting from said lever proximate said elbow portion for upwardly displacing said shear pin when said lever is releasably pivoted from its clamping position.

2. An aircraft seat according to claim 1 additionally comprising a shaft on which said lever is pivotally mounted to said track fitting and resilient bushing means between said shaft and said lever.

* * * * *